(No Model.) 3 Sheets—Sheet 1.
E. ELSWORTH & A. FABER DU FAUR.
STEAM COOKER.
No. 433,399. Patented July 29, 1890.
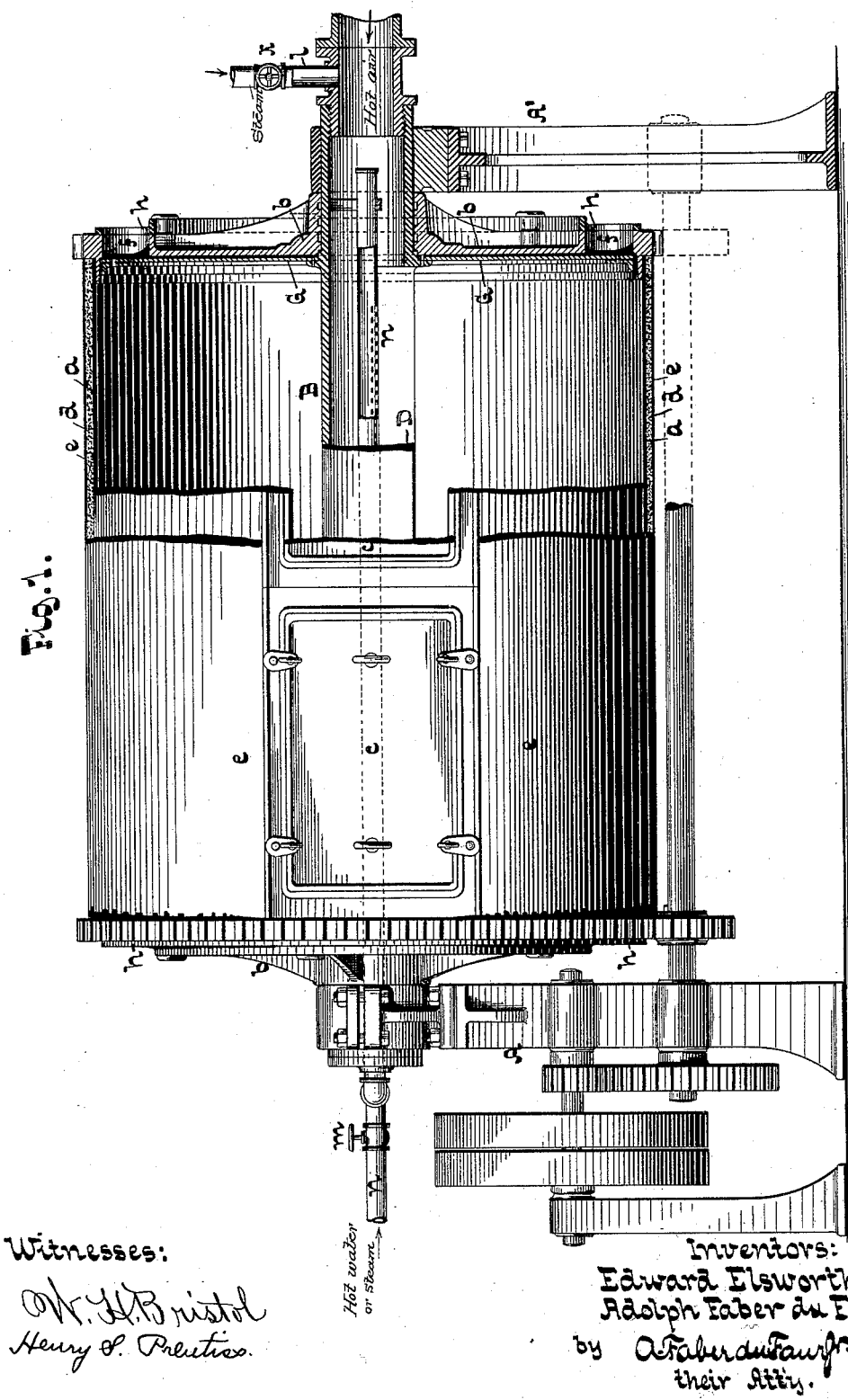

(No Model.) 3 Sheets—Sheet 2.
E. ELSWORTH & A. FABER DU FAUR.
STEAM COOKER.
No. 433,399. Patented July 29, 1890.
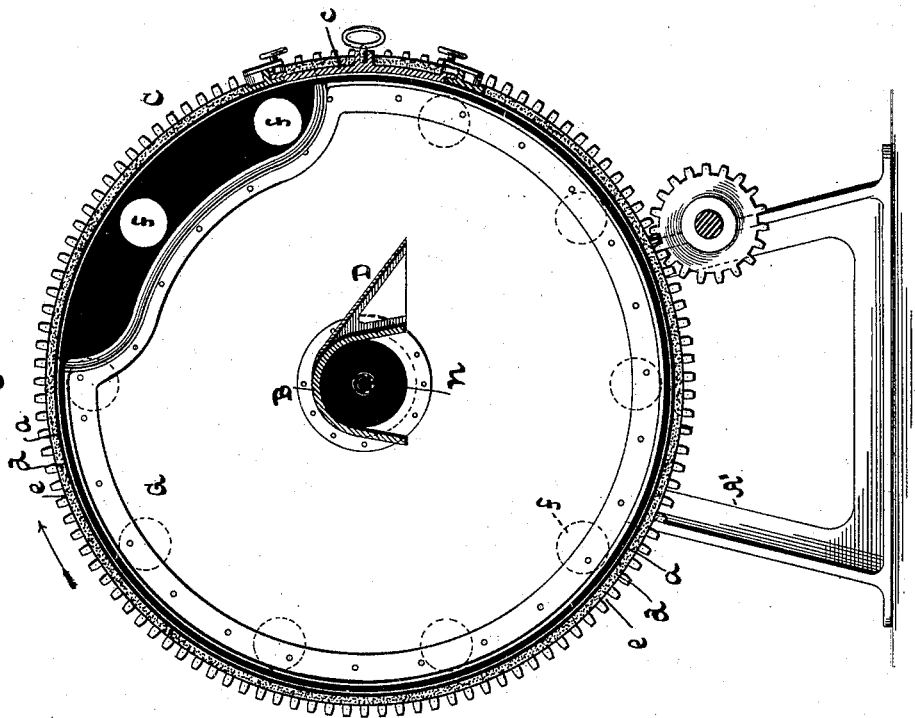
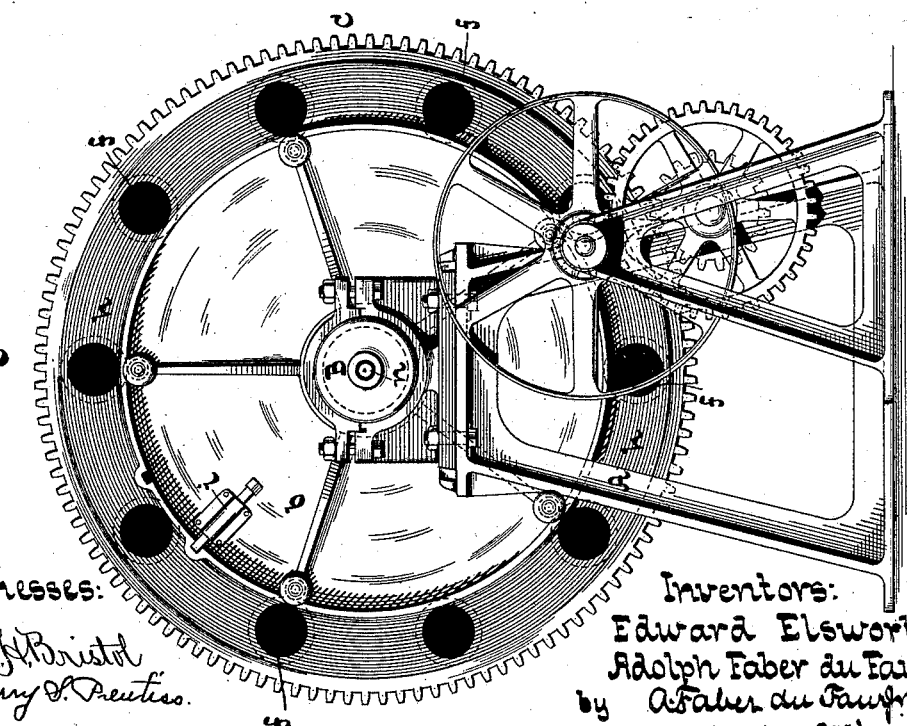
Witnesses:
W.H.Bristol
Henry S. Prentiss
Inventors:
Edward Elsworth,
Adolph Faber du Faur,
by A. Faber du Faur Jr.
their Atty.

(No Model.) 3 Sheets—Sheet. 3.
E. ELSWORTH & A. FABER DU FAUR.
STEAM COOKER.
No. 433,399. Patented July 29, 1890.
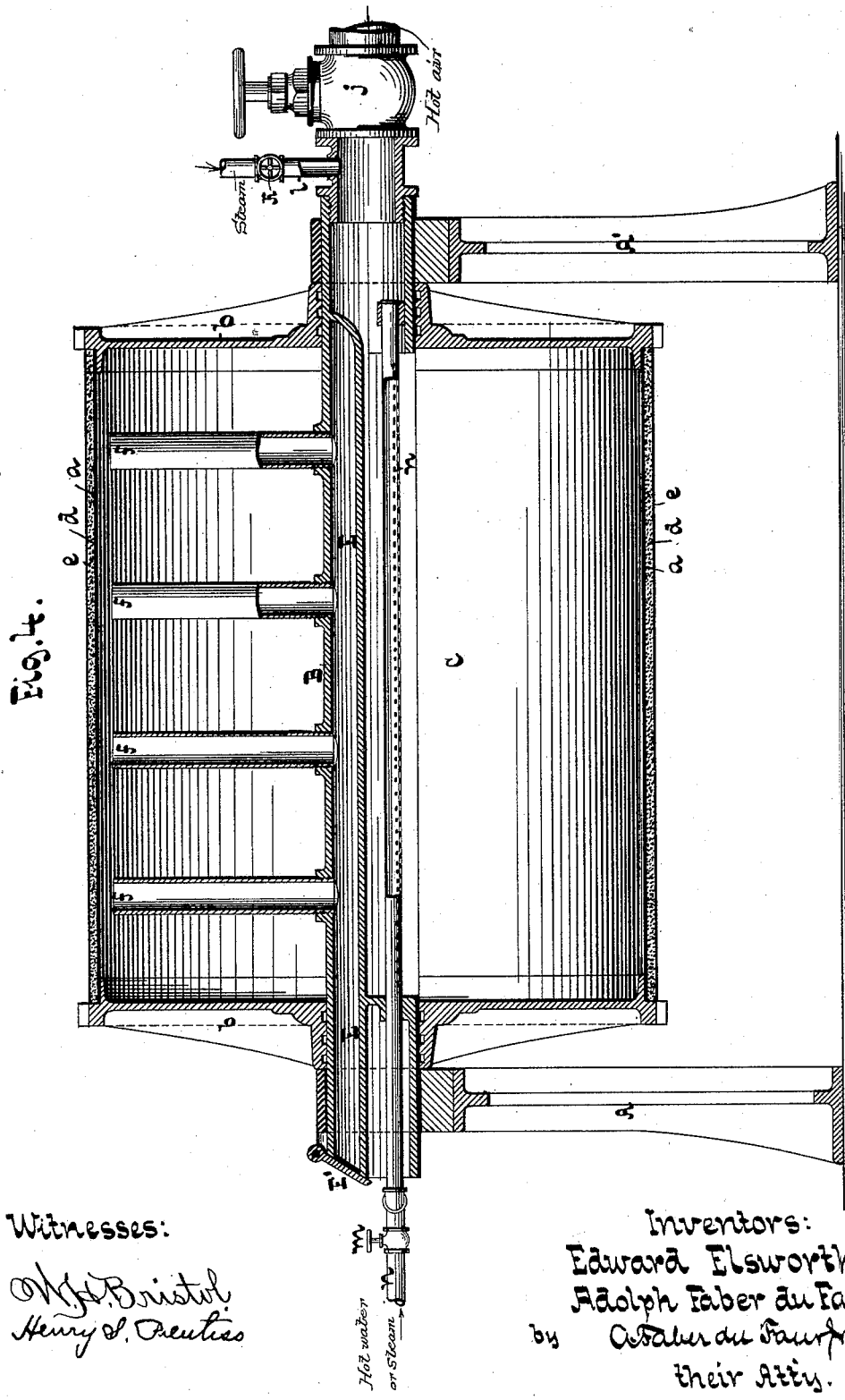
Witnesses:
O. H. Bristol
Henry S. Prentiss
Inventors:
Edward Elsworth,
Adolph Faber du Faur,
by A. Faber du Faur Jr.
their Atty.

UNITED STATES PATENT OFFICE.

EDWARD ELSWORTH, OF NEW YORK, N. Y., AND ADOLPH FABER DU FAUR, OF NEWARK, NEW JERSEY; SAID FABER DU FAUR ASSIGNOR TO SAID ELSWORTH.

STEAM-COOKER.

SPECIFICATION forming part of Letters Patent No. 433,399, dated July 29, 1890.

Application filed December 14, 1889. Serial No. 333,699. (No model.)

*To all whom it may concern:*

Be it known that we, EDWARD ELSWORTH, a citizen of the United States, and a resident of New York, in the county and State of New York, and ADOLPH FABER DU FAUR, a citizen of the United States, and a resident of Newark, in the county of Essex and State of New Jersey, have invented certain new and useful Improvements in Steam-Cookers, of which the following is a specification.

Our invention relates to apparatus for preparing grain for the market by steaming, cooking, and drying the same. Drums with perforated revolving shafts and with inlets for steam and hot air have long been used for this purpose; but such revolving shafts had to be covered with wire-cloth, which was troublesome to clean, and the steam and hot air entered the drum through the whole surface of the wire-cloth or perforated shaft. Such drums have also been provided with longitudinal pipes or with shelves where the grain would lodge and which prevented easy access to the interior.

The objects of our invention are to avoid as much as possible the use of screens or wire-cloth and of surfaces where the grain might lodge and to facilitate access to the interior of the drum. We attain these objects by mechanism illustrated in the accompanying drawings, in which—

Figure 1 is a side elevation of the apparatus, partly in section. Fig. 2 is a sectional end elevation. Fig. 3 is a cross-section. Fig. 4 is a longitudinal section of the apparatus with stationary outlet.

Similar letters refer to similar parts throughout the several views.

A A' are standards supporting and holding a stationary shaft B, with cylindrical tubular ends, and with a central part having its lower portion open throughout its whole length, or nearly so.

C is a hollow drum formed in the example shown of a cylindrical shell $a$ and cast-iron ends or heads $b\ b$, which are loosely mounted upon the shaft between the standards A A'. The drum has one or more doors $c\ c$ and is, by preference, provided with a non-conducting coating $d$, held in place by an outer shell or netting $e$.

As shown in Figs. 1, 2, and 3, the heads $b\ b$ of the drum are provided with a series of concentric discharge-openings $f$ for air or vapors, which may be provided with removable wire-netting and which are protected by stationary guards G, attached to the shaft B, leaving only a few escape-openings uncovered at or near the top of the drum. On the outer sides of the heads are register-rings $h\ h$ for closing the openings $f\ f$, when desired. A latch $i$ serves to hold these rings in position.

The necessary pipes and valves are provided for admitting steam, hot air, or hot water into the cylinder. Thus the valve $j$ (shown in Fig. 4) serves for admitting hot air into the hollow shaft, the valve $k$ and pipe $l$ for admitting steam, and the valve $m$ and perforated pipe $n$ for admitting a measured quantity of hot water into the drum.

A longitudinal shield D projects from the stationary shaft B between the heads of the drum and serves to reduce the area on one side of the shaft where the drum turns downwardly, as indicated by the arrow in Fig. 3. The shield may be made adjustable. The drum is slowly revolved by means such as shown in the drawings, or by any other suitable means.

In the modification shown in Fig. 4 the stationary shaft is provided with the stationary discharge-channel E, from which pipes extend to near the top of the drum, so as to form openings $f$ at or near the top of the drum for the escape of air or vapors. Said openings of the pipes may face upwardly, as shown, and may be covered by guards, or they may face sidewise by using bends or elbows. The discharge-channel E is provided with a valve or damper E'.

The operation of the apparatus is as follows: A sufficient quantity of grain is placed within the drum to have a thick layer above the shield D, when the drum is rotated, the doors closed, the drum set in motion, and steam admitted until the grain is thoroughly cooked. During this part of the process the discharge is, by preference, closed after the air has been expelled. When the grain is cooked, hot air is forced into the drum through the hollow shaft, the escape-openings being opened, whereby the grain is dried and is then discharged through the doors. By means of the perforated pipe $n$ a measured quantity of boiling water may be sprinkled upon the grain at the commencement of the operation, so as to soak it more rapidly. This perforated pipe may also be used for admitting steam into the drum.

Shelves or projections may be used for carrying the grain to the top of the drum; but we have found that even in a five-foot cylinder the circulation of the grain is perfect without them.

What we claim as new, and desire to secure by Letters Patent, is—

1. In a steam-cooker, a rotary drum, a stationary hollow shaft extending through the same and having hollow trunnions at its ends upon which the drum rotates, the under central part of said hollow shaft being cut away so as to form an inverted trough between the ends of the drum, substantially as described.

2. In a steam-cooker, a rotary drum, a stationary hollow shaft extending through the drum and having hollow trunnions at its ends, the under central part of said hollow shaft being cut away so as to form an inverted trough between the ends of the drum, steam and hot-air pipes connected to the said stationary shaft, and means, substantially as described, for the escape of air or vapors from near the top of the drum, substantially as specified.

3. In a steam-cooker, a rotary drum, a stationary hollow shaft extending through the drum and having hollow trunnions at its ends, the under central part of said hollow shaft being cut away so as to form an inverted trough between the ends of the drum, said shaft containing a longitudinal channel passing through one of its ends, and pipes extending from said channel to near the top of the drum, substantially as and for the purpose specified.

4. In a steam-cooker, a rotary drum, a stationary hollow shaft extending through the drum and having its lower portion opening into the drum substantially throughout its entire length, and a shield D, extending from one side of the stationary shaft, substantially as specified.

5. In a steam-cooker, a rotary drum, a stationary hollow shaft extending through the drum and having hollow trunnions at its ends, the under central part of said hollow shaft being cut away so as to form an inverted trough between the ends of the drum, and a pipe perforated at its lower side passing through one end of the stationary shaft, substantially as described.

In testimony that we claim the foregoing as our invention we have signed our names, in presence of two witnesses, this 7th day of December, 1889.

EDWARD ELSWORTH.
ADOLPH FABER DU FAUR.

Witnesses:
GUSTAVUS LEVY,
DANIEL J. HOGAN.